United States Patent
Yoon et al.

(10) Patent No.: US 12,491,495 B2
(45) Date of Patent: Dec. 9, 2025

(54) METHOD FOR PREPARING SUPER ABSORBENT POLYMER

(71) Applicant: LG CHEM, LTD., Seoul (KR)

(72) Inventors: Hyungki Yoon, Daejeon (KR); Young Jae Hur, Daejeon (KR); Jin Hyuck Ju, Daejeon (KR); Taebin Ahn, Daejeon (KR); Dong Hoon Park, Daejeon (KR); Kwangin Shin, Daejeon (KR); Jae Soon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 596 days.

(21) Appl. No.: 17/916,952

(22) PCT Filed: Jan. 14, 2022

(86) PCT No.: PCT/KR2022/000719
§ 371 (c)(1),
(2) Date: Oct. 4, 2022

(87) PCT Pub. No.: WO2022/154566
PCT Pub. Date: Jul. 21, 2022

(65) Prior Publication Data
US 2023/0149897 A1 May 18, 2023

(30) Foreign Application Priority Data

Jan. 14, 2021 (KR) .................. 10-2021-0005519
Jan. 12, 2022 (KR) .................. 10-2022-0004887

(51) Int. Cl.
| | |
|---|---|
| *C08J 3/12* | (2006.01) |
| *B01J 20/26* | (2006.01) |
| *B01J 20/30* | (2006.01) |
| *C08F 220/06* | (2006.01) |
| *C08J 3/24* | (2006.01) |

(52) U.S. Cl.
CPC ......... *B01J 20/267* (2013.01); *B01J 20/3021* (2013.01); *B01J 20/3085* (2013.01); *C08F 220/06* (2013.01); *C08J 3/12* (2013.01); *C08J 3/244* (2013.01); *C08J 3/245* (2013.01); *C08F 2810/20* (2013.01); *C08J 2333/02* (2013.01)

(58) Field of Classification Search
CPC .. B01J 20/267; B01J 20/3021; B01J 20/3085; B01J 20/261; B01J 20/264; B01J 20/28047; B01J 2220/68; C08F 220/06; C08F 2810/20; C08F 2/44; C08F 2/48; C08F 4/30; C08J 3/12; C08J 3/244; C08J 3/245; C08J 2333/02; C08J 3/075; C08L 33/064

See application file for complete search history.

(56) References Cited

U.S. PATENT DOCUMENTS

| | | | |
|---|---|---|---|
| 7,265,190 B2 * | 9/2007 | Dairoku ................ | B01J 19/24 526/918 |
| 2005/0013992 A1 | 1/2005 | Azad et al. | |
| 2010/0009846 A1 | 1/2010 | Ikeuchi et al. | |
| 2010/0286287 A1 | 11/2010 | Walden | |
| 2011/0301560 A1 | 12/2011 | Fujimura et al. | |
| 2012/0083411 A1 | 4/2012 | Ahmed et al. | |
| 2013/0324396 A1 | 12/2013 | Honda et al. | |
| 2018/0094131 A1 | 4/2018 | Tanaka et al. | |
| 2019/0194366 A1 | 6/2019 | Sohn et al. | |
| 2020/0139344 A1 | 5/2020 | Kim et al. | |
| 2021/0069674 A1 | 3/2021 | Jung et al. | |
| 2021/0094017 A1 | 4/2021 | Choi et al. | |
| 2021/0146336 A1 | 5/2021 | Kim et al. | |
| 2022/0387971 A1 | 12/2022 | Matsumoto et al. | |
| 2024/0124671 A1 | 4/2024 | Kim et al. | |

FOREIGN PATENT DOCUMENTS

| | | |
|---|---|---|
| CN | 101600762 A | 12/2009 |
| CN | 102574100 A | 7/2012 |
| CN | 111868152 A | 10/2020 |
| CN | 112004871 A | 11/2020 |
| CN | 114728265 A | 7/2022 |
| EP | 2116571 A1 | 11/2009 |
| EP | 4059602 A1 | 9/2022 |
| EP | 4180467 A1 | 5/2023 |
| JP | S64-62317 A | 3/1989 |
| JP | 01-223161 A | 9/1989 |
| JP | H04-120111 A | 4/1992 |
| JP | 07-62119 A | 3/1995 |
| JP | H11-302310 A | 11/1999 |
| JP | 2006-299234 A | 11/2006 |

(Continued)

OTHER PUBLICATIONS

International Search Report and Written Opinion dated May 4, 2022, issued in corresponding International Patent Application No. PCT/KR2022/000719.

(Continued)

*Primary Examiner* — Kumar R Bhushan
(74) *Attorney, Agent, or Firm* — Morgan, Lewis & Bockius LLP

(57) ABSTRACT

The present disclosure relates to a method for preparing a super absorbent polymer. More specifically, it relates to a method for preparing a super absorbent polymer capable of preparing a super absorbent polymer in which the residual monomer content and the extractable content are simultaneously reduced by adding a reducing agent capable of a redox reaction with a thermal polymerization initiator before drying the hydrogel polymer.

10 Claims, No Drawings

(56) References Cited

FOREIGN PATENT DOCUMENTS

| | | | |
|---|---|---|---|
| JP | 2007-291351 A | | 11/2007 |
| JP | 2011-503282 A | | 1/2011 |
| JP | 5164229 B2 | | 3/2013 |
| JP | 2016124901 A | * | 7/2016 |
| JP | 2020-504191 | | 2/2020 |
| JP | 2021-505716 A | | 2/2021 |
| JP | 2021-517606 A | | 7/2021 |
| JP | 2024-501988 A | | 1/2024 |
| JP | 2024-504326 A | | 1/2024 |
| KR | 10-2014-0012124 A | | 1/2014 |
| KR | 10-1511820 B1 | | 4/2015 |
| KR | 10-2016-0112220 A | | 9/2016 |
| KR | 10-2018-0071933 A | | 6/2018 |
| KR | 20180071933 A | * | 6/2018 |
| KR | 10-2020-0075195 A | | 6/2020 |
| KR | 10-2020-0075605 A | | 6/2020 |
| KR | 10-2020-0076293 A | | 6/2020 |
| KR | 20200075195 A | * | 6/2020 |
| KR | 20200075605 A | * | 6/2020 |
| KR | 20200076293 A | * | 6/2020 |
| KR | 10-2020-0087616 A | | 7/2020 |
| KR | 20200087616 A | * | 7/2020 |
| KR | 10-2021-0038250 A | | 4/2021 |
| WO | 2009/011717 A1 | | 1/2009 |
| WO | WO-2011040530 A1 | * | 4/2011 ............ B01J 20/26 |
| WO | 2016/148397 A1 | | 9/2016 |
| WO | 2016/158976 A1 | | 10/2016 |
| WO | 2021/095806 A1 | | 5/2021 |
| WO | 2022/014550 A1 | | 1/2022 |

OTHER PUBLICATIONS

George Odian, "Principles of Polymerization," Second Edition, A Wiley-Interscience Publication, John Wiley & Sons, Inc., p. 203 (1981).

Reinhold Schwalm, "UV Coatings Basics, Recent Developments and New Applications," Elsevier, p. 115, (2006).

Extended European Search Report dated Sep. 27, 2023, of the corresponding European Patent Application No. 22739759.3.

Office Action dated Oct. 23, 2023 issued in corresponding Japanese Patent Application No. 2022-565675.

Third Party of Observation dated May 14, 2023, for corresponding International Patent Application No. PCT/KR2022/000719.

Office Action issued in corresponding Chinese Patent Application 202280003553.5 dated Jul. 23, 2024.

* cited by examiner

METHOD FOR PREPARING SUPER ABSORBENT POLYMER

TECHNICAL FIELD

Cross-Reference to Related Application

This application claims the benefit of Korean Patent Applications No. 10-2021-0005519 filed on Jan. 14, 2021 and No. 10-2022-0004887 filed on Jan. 12, 2022 with the Korean Intellectual Property Office, the disclosures of which are incorporated herein by reference in their entirety.

The present disclosure relates to a method for preparing a super absorbent polymer. More specifically, it relates to a method for preparing a super absorbent polymer capable of preparing a super absorbent polymer having a reduced extractable content while minimizing the residual monomer content by adding a reducing agent capable of a redox reaction with a thermal polymerization initiator before chopping the hydrogel polymer.

Background of Art

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products, but also for water retaining soil products for gardening, water stop materials for the civil engineering and construction, sheets for raising seedling, fresh-keeping agents for food distribution fields, materials for poultices, or the like.

These super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the pulp content is reduced or pulp is not used at all is being actively advanced.

In addition, in order to be widely used in sanitary materials, it is necessary to exhibit high moisture absorbency, it should not release the absorbed water even under external pressure, and additionally it should well retain the shape even in a state where the volume is expanded (swelled) by absorbing water, thereby exhibiting excellent permeability.

In addition, pressure may be applied to sanitary materials such as diapers or sanitary napkins by the weight of the user. In particular, when the super absorbent polymer applied to sanitary materials such as diapers or sanitary napkins absorbs liquid, and then pressure is applied thereto by the user's weight, a rewet phenomenon in which some liquid absorbed in the super absorbent polymer oozes out again and urine leakage may occur.

In particular, when extractable contents having a short chain, which have been polymerized but not cross-linked, are present in the super absorbent polymer, the rewet phenomenon is further caused. In addition, when the residual monomer content remaining in the super absorbent polymer without polymerization is high, there is a sanitary problem.

Accordingly, various attempts have been made to simultaneously reduce the extractable content and the residual monomer content in the super absorbent polymer. However, an appropriate method for this has not yet been proposed.

DETAILED DESCRIPTION OF THE INVENTION

Technical Problem

Accordingly, the present disclosure relates to a method for preparing a super absorbent polymer capable of minimizing the residual monomer content remaining in the super absorbent polymer and reducing the extractable content generated during drying by adding a reducing agent containing a sulfur-containing anion in the chopping step of the hydrogel polymer to cause an additional polymerization reaction during chopping.

Technical Solution

In order to solve the above problems, there is provided a method for preparing a super absorbent polymer, including the steps of:
preparing a monomer composition containing an acrylic acid-based monomer having acidic groups in which at least a portion of the acidic groups is neutralized, an internal cross-linking agent, and a thermal polymerization initiator (step 1);
preparing a hydrogel polymer by cross-linking polymerization of the monomer composition (step 2);
performing chopping after mixing the hydrogel polymer with a reducing agent (step 3);
forming a base resin by drying and pulverizing the hydrogel polymer chopped in the step 3 (step 4); and
forming a surface cross-linked layer on at least a part of the surface of the base resin by further cross-linking the surface of the base resin in the presence of a surface cross-linking agent (step 5),
wherein the reducing agent is at least one selected from the group consisting of sulfoxylates, sulfites, bisulfites and metabisulfites, and is used in an amount of 10 parts by weight or more based on 100 parts by weight of the thermal polymerization initiator.

Advantageous Effects

According to the method for preparing a super absorbent polymer of the present disclosure, when the super absorbent polymer is prepared by adding a reducing agent having a specific structure including a sulfur-containing anion in the step of chopping the hydrogel polymer, the remaining monomers are polymerized by an additional radical initiation reaction according to the redox reaction of the reducing agent and the thermal polymerization initiator during chopping, so that the residual monomer content in the super absorbent polymer may be reduced. In addition, extractable contents that may be caused when the chopped hydrogel polymer is dried can also be reduced according to additional polymerization reaction during chopping. Accordingly, it is possible to prepare a super absorbent polymer in which the residual monomer content and the extractable content are simultaneously reduced.

DETAILED DESCRIPTION OF THE EMBODIMENTS

The terminology used herein is for the purpose of describing particular embodiments only and is not intended to limit the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In addition, the terminologies are used merely to refer to specific embodiments, and are not intended to restrict the present disclosure. Singular expressions of the present disclosure may include plural expressions unless they are differently expressed contextually.

The terminology "polymer" in the present disclosure is in a state in which a water-soluble ethylene-based unsaturated monomer is polymerized, and may include all moisture content ranges, or all particle diameter ranges. Among the polymers, a polymer having a moisture content of about 40 wt % or more after polymerization and before drying may be referred to as a hydrogel polymer, and particles in which the hydrogel polymer is pulverized and dried may be referred to as a cross-linked polymer.

In addition, the terminology "super absorbent polymer particle" refers to a particulate material containing a cross-linked polymer in which an acrylic acid-based monomer having at least partially neutralized acidic groups is polymerized and cross-linked by an internal cross-linking agent.

In addition, the terminology "super absorbent polymer" is used to encompass all of a cross-linked polymer in which an acrylic acid-based monomer having at least partially neutralized acidic groups is polymerized or a base resin in the form of powder consisting of super absorbent polymer particles in which the cross-linked polymer is pulverized, and the cross-linked polymer or the base resin further processed, for example, surface cross-linking, fine reassembling, drying, pulverization, classification, etc., to be in a state suitable for commercialization, depending on the context. Accordingly, the terminology "super absorbent polymer" may be interpreted as including a plurality of super absorbent polymer particles.

In order for the super absorbent polymer to be widely used as a sanitary material, the super absorbent polymer should not only have excellent absorption performance, but also reduce the residual monomer (RM) remaining in the super absorbent polymer without participating in polymerization, and the extractable contents (E/C) having short chains that have participated in polymerization but not bonded to the main chain. However, it is not easy to simultaneously reduce the residual monomer content and the extractable contents. The reason is that when a large amount of a polymerization initiator is added to reduce the residual monomer content in the preparation of the base resin, the extractable content is increased, and when the polymerization initiator content is reduced to reduce the extractable content, the residual monomer content is increased.

Accordingly, the present inventors have discovered that when a reducing agent capable of a redox reaction with a thermal polymerization initiator is added before the drying process after the preparation of the hydrogel polymer, an additional radical initiation reaction that occurs through a reaction with the thermal polymerization initiator remaining unreacted in the polymerization process can simultaneously reduce the residual monomer content and the extractable content without deteriorating the absorption rate and absorption performance of the super absorbent polymer, thereby completing the present invention. This may be because the thermal polymerization initiator is reduced due to the redox reaction between the remaining thermal polymerization initiator and the reducing agent, which may induce an additional radical initiation reaction. Accordingly, the residual monomers remaining without participating in polymerization are polymerized, and components that are not bonded to the main chain constituting the cross-linked polymer may also be bonded to the main chain. In addition, the remaining thermal polymerization initiator has a side effect of destroying the main chain during high-temperature drying, but such side effect occurring in the high-temperature drying can be prevented by exhausting the remaining thermal polymerization initiator at a low temperature.

The super absorbent polymer prepared in this way satisfies an Ideal Hydrogel Index (IHI) calculated by the following Equation 1 of 20 or more, which indicates the balance between the absorption performance, residual monomer content, and extractable content. Accordingly, the super absorbent polymer has characteristics of suppressing rewetting and reducing the extractable content unsuitable for hygiene while maintaining absorption performance, so that it can be more suitably used for sanitary materials.

$$\text{Ideal Hydrogel Index(IHI)}=(CRC+8.7)/[\ln\{E/C+(RM/500)\}] \qquad \text{[Equation 1]}$$

in Equation 1,

CRC is centrifuge retention capacity measured according to the method of EDANA NWSP 241.0.R2, E/C is an extractable content contained in the super absorbent polymer measured according to the method of EDANA WSP 270.2, and RM is a residual monomer content remaining in the super absorbent polymer measured according to the method of EDANA NWSP 210.0.R2.

Hereinafter, each step of the method for preparing a super absorbent polymer according to a specific embodiment of the present disclosure will be described in more detail.

(Step 1)

In the preparation method according to one embodiment, step 1 is a step of preparing a monomer composition containing an acrylic acid-based monomer having at least partially neutralized acidic groups, an internal cross-linking agent, and a thermal polymerization initiator.

The acrylic acid-based monomer is a compound represented by the following Chemical Formula 1:

$R^1$—COOM$^1$ [Chemical Formula 1]

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer may include at least one selected from the group consisting of acrylic acid, methacrylic acid, and a monovalent metal salt, a divalent metal salt, an ammonium salt and an organic amine salt thereof.

Herein, the acrylic acid-based monomers may be those having acidic groups which are at least partially neutralized.

Preferably, the acrylic acid-based monomer partially neutralized with an alkali substance such as sodium hydroxide, potassium hydroxide, ammonium hydroxide, or the like may be used. A degree of neutralization of the acrylic acid-based monomer may be 40 to 95 mol %, 40 to 80 wt %, or 45 to 75 mol %. The range of the degree of neutralization can be adjusted according to final properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, a concentration of the acrylic acid-based monomer may be about 20 to 60 wt %, or about 40 to 50 wt % based on the monomer composition containing the raw materials of the super absorbent polymer and the solvent, and properly controlled in consideration of polymerization time and reaction conditions. When the concentration of the monomer is excessively low, the yield of the super absorbent polymer is low and there may be a problem in economic efficiency. In contrast, when the concentration is excessively high, it may cause problems in processes in that some of the monomer may be extracted or the pulverization efficiency of the polymerized hydrogel polymer may be lowered in the pulverization process, and thus physical properties of the super absorbent polymer may be deteriorated.

In addition, the terminology 'internal cross-linking agent' used herein is different from a surface cross-linking agent for cross-linking the surface of the super absorbent polymer particles to be described later, and the internal cross-linking agent polymerizes unsaturated bonds of the water-soluble ethylene-based unsaturated monomers by cross-linking. The cross-linking in the above step proceeds both on the surface and on the inside, but when the surface cross-linking process of the super absorbent polymer particles to be described later is in progress, the surface of the particles of the finally prepared super absorbent polymer has a structure cross-linked by a surface cross-linking agent, and the inside of the particles has a structure cross-linked by the internal cross-linking agent.

As the internal cross-linking agent, any compound may be used as long as it allows the introduction of cross-linking bonds during polymerization of the acrylic acid-based monomer. Specifically, the internal cross-linking agent may be a cross-linking agent having one or more ethylene-based unsaturated groups in addition to the functional group which may react with the water-soluble substituents of the acrylic acid-based monomer; or a cross-linking agent having two or more functional groups which may react with the water-soluble substituents of the monomer and/or the water-soluble substituents formed by hydrolysis of the monomer.

For example, as the internal cross-linking agent, a multifunctional cross-linking agent may be used alone or in combination of two or more. Specifically, examples of the internal cross-linking agent include an acrylate-based compound such as N,N'-methylenebisacrylamide, trimethylpropane tri(meth)acrylate, ethylene glycol di(meth)acrylate, polyethylene glycol (meth)acrylate, polyethylene glycol di(meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, pentaerythritol tetraacrylate, and allyl (meth)acrylate; an epoxy-based compound such as ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, polytetramethylene glycol diglycidyl ether, glycerol diglycidyl ether, glycerol triglycidyl ether, diglycerol polyglycidyl ether and polyglycerol polyglycidyl ether; triarylamine; propylene glycol; glycerin; and ethylene carbonate, but the present disclosure is not limited thereto.

In the monomer composition, the internal cross-linking agent may be used in an amount of 0.01 to 5 parts by weight based on 100 parts by weight of the acrylic acid-based monomer. For example, the internal cross-linking agent may be used in an amount of 0.01 parts by weight or more, 0.05 parts by weight or more, 0.1 parts by weight, or 0.15 parts by weight or more, and 5 parts by weight or less, 3 parts by weight or less, 2 parts by weight or less, 1 parts by weight or less, or 0.7 parts by weight or less based on 100 parts by weight of the water-soluble ethylene-based unsaturated monomer. When too little internal cross-linking agent is used, cross-linking does not occur sufficiently, and thus it may be difficult to achieve strength above an appropriate level, and when too much internal cross-linking agent is used, the internal cross-linking density increases, and thus it may be difficult to achieve a desired level of water retention capacity.

In addition, the monomer composition may further include a polymerization initiator for initiating a polymerization reaction of the monomer. The polymerization initiator is not particularly limited as long as it is generally used in the preparation of super absorbent polymers.

Specifically, the polymerization proceeds by thermal polymerization or photopolymerization. However, even when the photopolymerization method is applied thereto, a certain amount heat is generated by UV radiation and the like, and some heat occurs as the polymerization reaction, an exothermal reaction, progresses. Therefore, the photopolymerization initiator and the thermal polymerization initiator may be used together.

In one embodiment, as the thermal polymerization initiator, at least one selected from the group consisting of a persulfate-based compound, an azo-based compound, hydrogen peroxide, and ascorbic acid may be used. Specifically, sodium persulfate ($Na_2S_2O_8$), potassium persulfate ($K_2S_2O_8$), ammonium persulfate (($NH_4)_2S_2O_8$), and the like may be used as examples of the persulfate-based compound; and 2,2-azobis-(2-amidinopropane) dihydrochloride, 2,2-azobis-(N,N-dimethylene) isobutyramidine dihydrochloride, 2-(carbamoylazo) isobutylonitril, 2,2-azobis [2-(2-imidazolin-2-yl) propane] dihydrochloride, 4,4-azobis-(4-cyanovaleric acid), and the like may be used as examples of the azo-based compound. More various thermal polymerization initiators are well disclosed in "Principle of Polymerization (Wiley, 1981)" written by Odian, p 203, and the present disclosure is not limited thereto.

More specifically, the thermal polymerization initiator may include the persulfate-based compound. For example, sodium persulfate (SPS; $Na_2S_2O_8$) may be used as the thermal polymerization initiator.

The thermal polymerization initiator may be used in an amount of 0.05 to 0.25 parts by weight based on 100 parts by weight of the acrylic acid-based monomer. When the thermal polymerization initiator is used in an amount of less than 0.05 parts by weight, the polymerization rate is slowed and an additional radical initiation reaction by the reaction with the reducing agent does not sufficiently occur, so that it is difficult to reduce the residual monomer content. When the thermal polymerization initiator is used in an amount of more than 0.25 parts by weight, the extractable content may increase, which may cause rewetting of the super absorbent polymer.

In addition, the monomer composition may further include a photopolymerization initiator. Any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial lucirin TPO, namely, diphenyl(2,4,6-trimethylbenzoyl) phosphine oxide, may be used. More various photopolymerization initiators are well disclosed in "UV Coatings: Basics, Recent Developments and New Application (Elsevier, 2007)" written by Reinhold Schwalm, p 115, and the present disclosure is not limited thereto.

The photopolymerization initiator may be used at a concentration of 0.001 to 0.010 parts by weight based on 100 parts by weight of the acrylic acid-based monomer. When the concentration of the photopolymerization initiator is excessively low, the polymerization rate may become slow, and when the concentration is excessively high, the molecular weight of the super absorbent polymer may become low and properties may be uneven.

The monomer composition may further include an additive such as a thickener, a plasticizer, a preservation stabilizer, and an antioxidant, if necessary.

In addition, the monomer composition containing the monomer may be, for example, in the form of a solution dissolved in a solvent such as water. The solid content of the monomer composition in a solution state, that is, the concentration of the monomer, the internal cross-linking agent, and the polymerization initiator may be appropriately adjusted in consideration of the polymerization time and reaction conditions. For example, the solid content of the monomer composition may be 10 to 80 wt %, 15 to 60 wt %, or 30 to 50 wt %.

When the monomer composition has the solid content in the above range, it may be advantageous for controlling the pulverization efficiency during pulverization of the polymer to be described later while eliminating the need to remove unreacted monomers after polymerization by using a gel effect phenomenon occurring in the polymerization reaction of a high-concentration aqueous solution.

At this time, any solvent which can dissolve the above components may be used without limitation. For example, the solvent may be in combination of at least one selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide.

(Step 2)

Subsequently, a step of preparing a hydrogel polymer by cross-linking polymerization of the monomer composition is performed.

The polymerization of the monomer composition is not particularly limited as long as it is a commonly used polymerization method.

Specifically, the polymerization method is largely divided into the thermal polymerization and the photopolymerization according to an energy source of the polymerization. In the case of thermal polymerization, it is generally carried out in a reactor equipped with an agitation spindle, such as a kneader. In the case of photopolymerization, it may be carried out in a reactor equipped with a movable conveyor belt. However, the polymerization method is just an example, and the present disclosure is not limited thereto.

For example, in the reactor equipped with an agitation spindle such as a kneader, the hydrogel polymer obtained by thermal polymerization by supplying hot air or heating the reactor may be discharged to a reactor outlet in the form of several centimeters to several millimeters depending on a shape of the agitation spindle provided in the reactor. Specifically, a size of the hydrogel polymer obtained may vary depending on the concentration and injection rate of the monomer composition to be injected, and a hydrogel polymer having a weight average particle diameter of 2 to 50 mm may be usually obtained.

In addition, when photopolymerization is performed in the reactor equipped with a movable conveyor belt as described above, a hydrogel polymer in the form of a sheet having a belt width may usually be obtained. At this time, a thickness of the polymer sheet may vary depending on the concentration and injection rate of the monomer composition to be injected, and it is preferable to supply the monomer composition so that the polymer in the form of a sheet has a thickness of about 0.5 to about 5 cm. When the monomer composition is supplied to such an extent that the thickness of the polymer sheet is too thin, the production efficiency may be low. When the thickness of the polymer sheet exceeds 5 cm, the polymerization reaction may not occur evenly over the entire thickness due to the excessively thick thickness.

Meanwhile, in order to improve the absorption rate of the super absorbent polymer, a foaming agent capable of introducing a pore structure into the super absorbent polymer may be additionally used during cross-linking polymerization of the monomer composition. As the foaming agent, any compound capable of generating bubbles in the polymerization step known in the art may be used without limitation. For example, a carbonate-based foaming agent or an encapsulated foaming agent may be used.

As the carbonate-based foaming agent, at least one selected from the group consisting of sodium bicarbonate, sodium carbonate, potassium bicarbonate, potassium carbonate, calcium bicarbonate, calcium carbonate, magnesium bicarbonate and magnesium carbonate may be used.

The carbonate-based foaming agent may be used in an amount of 0.005 to 1 part by weight based on 100 parts by weight of the acrylic acid-based monomer. When the content of the foaming agent is less than 0.005 parts by weight, the effect of using the foaming agent may be insignificant. When the content of the foaming agent exceeds 1 part by weight, there are too many pores in the cross-linked polymer, so that the gel strength of the super absorbent polymer to be prepared decreases and the density decreases, which may cause problems in distribution and storage.

In addition, a thermally expandable microcapsule foaming agent having a core-shell structure may be used as the encapsulated foaming agent. More specifically, the encapsulated foaming agent has a core-shell structure having a core including a hydrocarbon and a shell formed of a thermoplastic resin on the core. Specifically, the hydrocarbon constituting the core is a liquid hydrocarbon having a low boiling point and is easily vaporized by heat. Therefore, when heat is applied to the encapsulated foaming agent, the thermoplastic resin constituting the shell is softened and the liquid hydrocarbon of the core is vaporized at the same time. In addition, as the pressure inside the capsule increases, the encapsulated foaming agent expands, and accordingly, bubbles having an increased size than the existing size are formed.

And, the hydrocarbon constituting the core of the encapsulated foaming agent may be at least one selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane and cyclooctane. Among them, the C3 to C5 hydrocarbons (n-propane, n-butane, iso-butane, cyclobutane, n-pentane, iso-pentane, cyclopentane) are suitable for forming pores having the above-mentioned size, and iso-butane may be most suitable.

In addition, the thermoplastic resin constituting the shell of the encapsulated foaming agent may be a polymer formed from at least one monomer selected from the group consisting of (meth)acrylate-based compounds, (meth)acrylonitrile-based compounds, aromatic vinyl compounds, vinyl acetate compounds, and halogenated vinyl compounds. Among them, a copolymer of (meth)acrylate and (meth)acrylonitrile may be most suitable for forming pores having the above-mentioned size.

In addition, the encapsulated foaming agent has a structure having a core including a hydrocarbon and a shell formed of a thermoplastic resin surrounding the core, while having an average diameter before expansion of 5 to 30 μm, and a maximum expansion ratio in air of 5 to 15 times.

In addition, the encapsulated foaming agent may be used in an amount of 0.005 to 1 part by weight based on 100 parts by weight of the acrylic acid-based monomer. When the content of the foaming agent is less than 0.005 parts by weight, the effect of adding the foaming agent may be insignificant. When the content of the foaming agent exceeds 1 part by weight, there are too many pores in the cross-linked polymer, so that gel strength of the super absorbent polymer to be prepared decreases and the density also decreases, which may cause problems in distribution and storage.

In addition, a surfactant commonly used as a foam stabilizer may be further added together with the carbonate-based foaming agent in the step 2. Examples of the surfactant include alkyl sulfate-based compounds, polyoxyethylene alkyl ether-based compounds, and the like. Examples of the alkyl sulfate-based compound include sodium dodecyl sulfate, ammonium lauryl sulfate, sodium lauryl ether sulfate, or sodium myreth sulfate, etc., and examples of the polyoxyethylene alkyl ether-based compound include polyoxyethylene lauryl ether. Herein, the alkyl sulfate-based compound is an anionic surfactant, and the polyoxyethylene alkyl ether-based compound is a non-ionic surfactant.

Generally, the moisture content of the hydrogel polymer obtained by the above method may be about 40 to about 80 wt %. At this time, "moisture content" in the present disclosure is the content of moisture in the entire weight of the polymer, and it means a value of which the weight of the dried polymer is subtracted from the weight of the polymer. Specifically, the moisture content is defined as a value calculated by measuring the weight loss due to moisture evaporation from the polymer in the process of increasing the temperature of the polymer for drying through infrared heating. At this time, the drying condition for measuring the moisture content is as follows: the temperature is increased to about 180° C. and maintained at 180° C., and the total drying time is 20 minutes including 5 minutes of a heating step.

(Step 3)

Subsequently, a step of performing chopping after mixing the hydrogel polymer with a reducing agent is performed. In the above step, the reducing agent undergoes a redox reaction with a thermal polymerization initiator to reduce the thermal polymerization initiator, and the reduced thermal polymerization initiator induces an additional radical initiation reaction following the primary radical initiation reaction in the step 2. Accordingly, as the polymer is chopped, residual monomers that did not participate in the polymerization reaction in the step 2 may be polymerized.

As the reducing agent used herein, at least one sulfur-containing compound selected from the group consisting of sulfoxylates, sulfites, bisulfites and metabisulfites, which can effectively perform a redox reaction with the above-described thermal polymerization initiator, is used.

More specifically, the sulfoxylates are a compound consisting of a metal cation and a sulfoxylate ion ($SO_2^-$). Examples of the sulfoxylates include sodium formaldehyde sulfoxylate (Rongalite; $HOCH_2SO_2Na$), cobalt (II) sulfoxylate ($CoSO_2$), and zinc sulfoxylate ($ZnSO_2$).

In addition, the sulfites are a compound consisting of a metal cation and a sulfite ion ($SO_3^-$). Examples of the sulfites include sodium sulfite ($Na_2SO_3$), potassium sulfite ($K_2SO_3$), and calcium sulfite ($CaSO_3$).

In addition, bisulfites are compounds consisting of a metal cation and a bisulfite ion ($HSO_3^-$). Examples of the bisulfites include sodium bisulfite ($NaHSO_3$), potassium bisulfite ($KHSO_3$), and calcium bisulfite ($Ca(HSO_3)_2$).

In addition, metabisulfites are compounds consisting of a metal cation and a metabisulfite ion ($S_2O_5^-$). Examples of the metabisulfites include sodium metabisulfite ($Na_2S_2O_5$), potassium metabisulfite ($K_2S_2O_5$), and calcium metabisulfite ($CaS_2O_5$).

For example, the reducing agent may be sodium formaldehyde sulfoxylate ($HOCH_2SO_2Na$), sodium sulfite ($Na_2SO_3$), or sodium metabisulfite ($Na_2S_2O_5$). These compounds may be more advantageous in terms of efficiency of reducing the residual monomer content.

In addition, the reducing agent is used in an amount of 10 parts by weight or more based on 100 parts by weight of the thermal polymerization initiator. When the reducing agent is used in an amount of less than 10 parts by weight based on 100 parts by weight of the thermal polymerization initiator, the redox reaction with the thermal polymerization initiator does not proceed effectively, making it difficult to simultaneously reduce the residual monomer content and the extractable content in the super absorbent polymer.

More specifically, the reducing agent may be used in an amount of 10 parts by weight to 100 parts by weight based on 100 parts by weight of the thermal polymerization initiator. When too much of the reducing agent is used, many reducing agents may remain unreacted, and an odor may be emitted after drying and surface treatment at a high temperature. For example, the reducing agent may be used in an amount of 10 parts by weight or more, 15 parts by weight or more, or 20 parts by weight or more, and 80 parts by weight or less, 70 parts by weight or less, 60 parts by weight or less, or 50 parts by weight based on 100 parts by weight of the thermal polymerization initiator.

In addition, in consideration of the content of the thermal polymerization initiator remaining after the polymerization step and the cost, the reducing agent may be used in an amount of 0.1 to 1 mol based on 1 mol of the thermal polymerization initiator. More specifically, the reducing agent may be used in an amount of 0.15 mol or more, 0.2 mol or more, 0.25 mol or more, or 0.3 mol or more, and 0.8 mol or less, 0.7 mol or less, 0.65 mol or less, or 0.6 mol or less based on 1 mol of the thermal polymerization initiator.

Furthermore, the reducing agent may be used in an amount of 0.01 to 0.1 parts by weight based on 100 parts by weight of the acrylic acid-based monomer. More specifically, the reducing agent may be used in an amount of 0.015 parts by weight or more, 0.02 parts by weight or more, 0.025 parts by weight or more, or 0.03 parts by weight or more, and 0.09 parts by weight or less, 0.08 parts by weight or less, 0.07 parts by weight or less, or 0.06 parts by weight or less based on 100 parts by weight of the acrylic acid-based monomer.

The method of mixing the reducing agent with the hydrogel polymer is not particularly limited as long as the reducing agent can be uniformly mixed with the hydrogel polymer, and it can be appropriately selected and used. Specifically, the reducing agent may be dry-mixed, dissolved in a solvent and then mixed, or melted and then mixed.

For example, the reducing agent may be mixed in the form of a solution dissolved in a solvent. At this time, water is most preferable for the solvent in consideration of the use of a salt compound in which a metal cation and a sulfur-containing anion are combined as the reducing agent, the ease of drying and the cost of a solvent recovery system. In addition, a method of adding the reducing agent and the hydrogel polymer in a reactor for mixing, a method of spraying the solution after adding the hydrogel polymer in a mixer, or a method of mixing the hydrogel polymer and the solution while continuously providing them to a continuously operating mixer may be used.

After mixing the hydrogel polymer and the reducing agent, the mixture may be chopped to prepare a chopped hydrogel polymer.

Specifically, the chopping may be performed with at least one pulverizing machine selected from the group consisting of a vertical pulverizer, a turbo cutter, a turbo grinder, a rotary cutter mill, a cutter mill, a disc mill, a shred crusher, a crusher, a chopper and a disc cutter, but the present disclosure is not limited thereto.

More specifically, the chopping of the hydrogel polymer may be performed by a chopper such as a meat chopper. In this case, the chopping step may be performed so that the particle diameter of the polymer is about 1 mm to about 10 mm. Chopping to a particle diameter of less than 1 mm is not technically easy due to the high moisture content of the hydrogel polymer, and a phenomenon of agglomeration between the chopped particles may occur. On the other hand, when chopped to a particle diameter of more than 10 mm, the effect of increasing the efficiency of the subsequent drying step is insignificant.

For this, the meat chopper may include a chopping module having one or more perforated plates, and each perforated plate (when there are two or more perforated plates, each of the two or more perforated plates) may be provided with a plurality of fine chopping holes having a certain size through which the hydrogel polymer can pass. In addition, a hole size of the fine chopping holes of the perforated plate may be 1 mm to 16 mm. In other words, it can be seen that the chopping is performed by pushing the hydrogel polymer such that the hydrogel polymer is pulverized while passing through the fine chopping holes of perforated plates. At this time, an extruder may be used to push out the hydrogel polymer. For example, a single- or multiple-screw extruder may be used.

(Step 4)

Subsequently, a step of drying and pulverizing the hydrogel polymer chopped in the above step 3 to form a powder-type base resin is performed.

The drying temperature in the drying step may be about 150 to about 250° C. When the drying temperature is less than 150° C., the drying time may become excessively long and physical properties of the super absorbent polymer to be finally formed may decrease. When the drying temperature is more than 250° C., only the surface of the polymer is excessively dried, fine powder may be generated in the subsequent pulverization process, and physical properties of the final super absorbent polymer may decrease. Therefore, the drying may preferably be performed at a temperature of about 150 to about 200° C., more preferably at a temperature of about 170 to about 200° C.

Meanwhile, the drying time may be about 20 minutes to about 90 minutes in consideration of process efficiency, but is not limited thereto.

The drying method in the drying step is not particularly limited if it has been generally used in the drying process of the hydrogel polymer. Specifically, the drying step may be performed by the method of hot air provision, infrared radiation, microwave radiation, UV ray radiation, and the like. After the drying step, the moisture content of the polymer may be about 5 to about 10 wt %.

Subsequently, a step of pulverizing the dried polymer obtained through the drying step is performed. At this time, the pulverization may be performed to form a powder including particles having a particle diameter of about 150 to about 850 μm. As the pulverizing machine used for pulverization to such a particle diameter, a pin mill, a hammer mill, a screw mill, a roll mill, a disc mill, a jog mill, or the like may be used, but the present disclosure is not limited thereto.

In order to manage the physical properties of the super absorbent polymer powder to be commercialized after the pulverization step, the base resin obtained after pulverization is classified according to particle size. Preferably, the polymer having a particle diameter of about 150 to about 850 μm is classified, and only the base resin having such a particle diameter may be subjected to a surface cross-linking reaction step. In this case, the particle diameter may be measured in accordance with the EDANA (European Disposables and Nonwovens Association) WSP 220.3.

In addition, the base resin may have an Ideal Hydrogel Index (IHI) calculated by the following Equation 1 of more than 19:

$$\text{Ideal Hydrogel Index(IHI)}=(CRC+8.7)/[\ln\{E/C+(RM/500)\}] \quad \text{[Equation 1]}$$

in Equation 1,

CRC is centrifuge retention capacity measured according to the method of EDANA NWSP 241.0.R2, E/C is an extractable content measured according to the method of EDANA WSP 270.2, and RM is a residual monomer content remaining in the super absorbent polymer measured according to the method of EDANA NWSP 210.0.R2.

Specifically, the base resin may have an Ideal Hydrogel Index (IHI) calculated by the Equation 1 of 19.3 or more, 19.5 or more, or 19.7 or more, and 23 or less, 22.5 or less, 22 or less, or 21.5 or less.

(Step 5)

Subsequently, a step of forming a surface cross-linked layer on at least a part of the surface of the base resin by further cross-linking the surface of the base resin in the presence of a surface cross-linking agent is performed. By the above step, there is provided a super absorbent polymer in which a surface cross-linked layer is formed on at least a part of the surface of the base resin, more specifically, on at least a part of the surface of each of the base resin particles.

The surface cross-linking is a step of increasing a cross-linking density near the surface of super absorbent polymer particles with regard to a cross-linking density inside the particles. Generally, surface cross-linking agents are applied on the surface of super absorbent polymer particles. Therefore, surface cross-linking reactions occur on the surface of the super absorbent polymer particles, which improves cross-linkability on the surface of the particles without substantially affecting the inside of the particles. Thus, the surface cross-linked super absorbent polymer particles have a higher degree of cross-linking at the surface than inside.

As the surface cross-linking agent, any surface cross-linking agent that has been conventionally used in the preparation of a super absorbent polymer may be used without any particular limitation. Examples of the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; at least one carbonate-based compound selected from the group consisting of ethylene carbonate, propylene carbonate, and glycerol carbonate; an epoxy compound such as ethylene glycol diglycidyl ether; an oxazoline compound such as oxazolidinone; a polyamine compound; a mono-, di- or poly-oxazolidinone compound; a cyclic urea compound; a polycarboxylic acid-based copolymer; and the like.

According to one embodiment, the surface cross-linking agent may be the same as the internal cross-linking agent. For example, the surface cross-linking agent may include ethylene glycol diglycidyl ether. The ethylene glycol diglycidyl ether has high water solubility and has two epoxy groups, so that the surface reaction can easily proceed even at a relatively low temperature.

For example, the surface cross-linking agent may include ethylene glycol diglycidyl ether and propylene glycol. Furthermore, the surface cross-linking agent may include ethylene glycol diglycidyl ether, propylene glycol, and a polycarboxylic acid-based copolymer.

The content of the surface cross-linking agent may be appropriately selected depending on the type of the added surface cross-linking agent or reaction conditions. For example, it may be used in an amount of about 0.001 to about 5 parts by weight, preferably about 0.01 to about 3 parts by weight parts, and more preferably about 0.05 to about 2 parts by weight based on 100 parts by weight of the base resin. When the content of the surface cross-linking agent is too small, the surface cross-linking reaction hardly occurs, and when it exceeds 5 parts by weight based on 100 parts by weight of the base resin, absorption properties such as water retention capacity may be deteriorated due to excessive surface cross-linking reaction.

In addition, the method of mixing the surface cross-linking agent with the base resin is not particularly limited. For example, a method of adding the surface cross-linking agent and the base resin powder in a reactor for mixing, a method of spraying the surface cross-linking agent onto the base resin powder, or a method of mixing the base resin and the surface cross-linking agent while continuously providing them to a continuously operating mixer may be used.

When adding the surface cross-linking agent, water may be mixed together and added in the form of a surface cross-linking solution. When water is added thereto, there is an advantage that the surface cross-linking agent may be evenly dispersed in the polymer. At this time, amounts of water to be added may be properly controlled for the purposes of inducing a uniform dispersion of the surface cross-linking agent, preventing an agglomeration phenomenon of the polymer powder, and optimizing a surface penetration depth of the surface cross-linking agent. For example, water may preferably be added in an amount of about 1 to about 10 parts by weight based on 100 parts by weight of the base resin.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto.

After the surface cross-linked layer is formed on the surface of the base resin as described above, an inorganic material may be further mixed therewith.

The inorganic material may be, for example, at least one selected from the group consisting of silica, clay, alumina, silica-alumina composite, and titania, and preferably silica.

The inorganic material may be used in an amount of 0.01 parts by weight or more, 0.05 parts by weight or more, or 0.1 parts by weight or more, and 5 parts by weight or less, 3 parts by weight or less, or 1 parts by weight or less based on 100 parts by weight of the super absorbent polymer.

Meanwhile, in order to control the properties of the super absorbent polymer to be finally commercialized, a step of classifying the super absorbent polymer obtained after the surface cross-linking step according to the particle diameter may be further performed. Preferably, a polymer having a particle diameter of about 150 to about 850 μm is classified, and then only a super absorbent polymer having such a particle diameter can be used as a final product.

The super absorbent polymer obtained by the above preparation method may have a residual monomer content measured according to the method of EDANA NWSP 210.0.R2 of 500 ppm or less, and an extractable content measured according to the method of EDANA WSP 270.2 of less than 10 wt %. Preferably, the super absorbent polymer may have a residual monomer content measured according to the method of EDANA NWSP 210.0.R2 of 400 ppm or less, and an extractable content measured according to the method of EDANA WSP 270.2 of less than 7 wt %.

In addition, the super absorbent polymer may have centrifuge retention capacity (CRC) of 30 to 35 g/g, when measured according to the method of EDANA WSP 241.3.

In addition, the super absorbent polymer may have absorbency under pressure (AUP) at 0.7 psi of 18 to 25 g/g, when measured according to the method of EDANA WSP 242.3.

In addition, the super absorbent polymer may have an Ideal Hydrogel Index (IHI) of 20 or more, when calculated by the following Equation 1:

Ideal Hydrogel Index(IHI)=(CRC+8.7)/[ln{E/C+ (RM/500)}]   [Equation 1]

in Equation 1,
CRC is centrifuge retention capacity measured according to the method of
EDANA NWSP 241.0.R2,
E/C is an extractable content measured according to the method of EDANA WSP 270.2, and
RM is a residual monomer content remaining in the super absorbent polymer measured according to the method of EDANA NWSP 210.0.R2.

More specifically, the super absorbent polymer obtained by the above preparation method may have a residual monomer content of 500 ppm or less, 450 ppm or less, 400 ppm or less, 390 ppm or less, or 380 ppm or less, when measured according to the method of EDANA NWSP 210.0.R2. In addition, as the lower residual monomer content can be evaluated as the better, the lower limit is theoretically 0 ppm, but may be 100 ppm or more, 150 ppm or more, or 200 ppm or more.

In addition, the super absorbent polymer may have an extractable content of less than 10 wt %, 9 wt % or less, 8 wt % or less, 7 wt % or less, 6.5 wt % or less, or 6.3 wt % or less, when measured according to the method of EDANA WSP 270.2. In addition, as the lower extractable content can be evaluated as the better, the lower limit is theoretically 0 wt %, but may be 3 wt % or more, 4 wt % or more, or 5 wt % or more.

In addition, the super absorbent polymer may have centrifuge retention capacity (CRC) of 30 g/g or more, or 31 g/g or more, and 35 g/g or less, or 33 g/g or less, when measured according to the method of EDANA WSP 241.3.

In addition, the super absorbent polymer may have absorbency under pressure (AUP) at 0.7 psi of 18 g/g or more, 20 g/g or more, or 21 g/g or more, and 25 g/g or less, or 24 g/g or less, when measured according to the method of EDANA WSP 242.3.

In addition, the super absorbent polymer may have an Ideal Hydrogel Index (IHI) of 20 or more, 20.5 or more, or 21 or more, when calculated by the Equation 1. Moreover, the upper limit of the IHI value may be, for example, 25 or less, 24 or less, or 23 or less.

The present invention will be described in more detail in the following examples. However, these examples are provided for illustrative purposes only, and the content of the present invention is not limited by the following examples.

Preparation Examples

Preparation of Encapsulated Foaming Agent

As an encapsulated foaming agent used in Examples, F-36D manufactured by Matsumoto, which has a core of iso-butane and a shell of a copolymer of acrylate and acrylonitrile, was prepared. At this time, the foaming start temperature ($T_{start}$) of the F-36D is 70° C. to 80° C., and the maximum foaming temperature ($T_{max}$) is 110° C. to 120° C.

The diameter of each encapsulated foaming agent was measured as an average Feret diameter with an optical microscope. Then, an average value of the diameters of the encapsulated foaming agents was obtained and defined as the average diameter of the encapsulated foaming agent.

In addition, in order to confirm expansion characteristics of the encapsulated foaming agent, 0.2 g of the encapsulated foaming agent prepared above was applied on a glass Petri dish, and then left on a hot plate preheated to 150° C. for 10 minutes. The encapsulated foaming agent expanded slowly by heat, and this was observed with an optical microscope to determine the maximum expansion ratio and maximum expansion size of the encapsulated foaming agent in air.

A diameter of the top 10 wt % of the highly expanded particles after applying heat to the encapsulated foaming agent was defined as the maximum expansion size, and a ratio (DM/Do) of the average diameter (DM) of the top 10 wt % of the highly expanded particles after applying heat to the average diameter (Do) measured before applying heat to the encapsulated foaming agent was defined as the maximum expansion ratio.

The average diameter of the prepared encapsulated foaming agent before expansion was 13 μm, the maximum expansion ratio in air was about 9 times, and the maximum expansion size was about 80 to 150 (m.

Example 1

(Step 1) In a 3 L glass container equipped with a stirrer and a thermometer, 100 g of acrylic acid, 0.001 g of PEGDA 400 (polyethylene glycol diacrylate, Mw=400) as an internal cross-linking agent, 0.17 g of ethylene glycol diglycidyl ether (EJ1030s), 0.008 g of diphenyl (2,4,6-trimethylbenzoyl)-phosphine oxide (1-819) as a photopolymerization initiator and 0.12 g of sodium persulfate (SPS) as a thermal polymerization initiator were added and dissolved. Then, 188 g of 22% sodium hydroxide solution was added to prepare a monomer composition (degree of neutralization: 75 mol %; solid content: 41 wt %).

(Step 2) 0.02 g of a 28% sodium dodecyl sulfate (SDS) aqueous solution and 0.18 g of an encapsulated foaming agent (F-36D) were added to the monomer composition. Thereafter, the monomer composition was supplied at 500 to 2000 mL/min on a conveyor belt in which a belt having a width of 10 cm and a length of 2 m was rotated at 50 cm/min. And, at the same time as the supply of the monomer composition, ultraviolet rays having an intensity of 10 mW/cm² were irradiated to perform the polymerization reaction for 60 seconds, thereby obtaining a sheet-type hydrogel polymer having a moisture content of 55 wt %.

(Step 3) Subsequently, 0.032 parts by weight of sodium metabisulfite (SMBS; $Na_2S_2O_5$, Poohung Photo-Chemical Co.,Ltd.) based on 100 parts by weight of the acrylic acid monomer was dissolved in 54 g of water, and then sprayed onto the hydrogel polymer cut to a size of about 5 cm×5 cm. Thereafter, it was chopped in a meat chopper to obtain hydrogel particle crumbs having a size of 1 mm to 10 mm.

(Step 4) Thereafter, the crumbs were dried in an oven capable of changing wind direction up and down. Thereafter, it was uniformly dried by flowing hot air at 185° C. or higher from the bottom to the top for 15 minutes, and then flowing from the top to the bottom for 15 minutes, and the moisture content of the dried crumbs was set to 2% or less. After drying, pulverization was performed with a pulverizing machine, followed by classification to prepare a base resin having a diameter of 150 to 850 μm.

(Step 5) A surface cross-linking solution was prepared by mixing 4 g of water, 1.0 g of propylene glycol, 0.08 g of ethylene glycol diglycidyl ether, and 0.05 g of a polycarboxylic acid-based copolymer (a copolymer of methoxy polyethylene glycol monomethacrylate and methacrylic acid, Mw=40,000) based on 100 g of the base resin. The surface cross-linking solution was sprayed on 100 g of the obtained base resin powder for mixing, put into a container consisting of a stirrer and a double jacket, and the surface cross-linking reaction was performed at 140° C. for 35 minutes. Thereafter, the surface-treated powder was classified with a ASTM standard mesh to obtain a super absorbent polymer powder having a particle diameter of 150 to 850 μm. Then, 0.1 g of fumed silica (AEROSIL® 200) was further mixed based on 100 parts by weight of the obtained polymer powder.

Example 2

A super absorbent polymer was prepared in the same manner as in Example 1, except that 0.040 parts by weight of sodium metabisulfite (SMBS; $Na_2S_2O_5$) was used based on 100 parts by weight of the acrylic acid monomer in the step 3 of Example 1.

Example 3

A super absorbent polymer was prepared in the same manner as in Example 1, except that 0.048 parts by weight of sodium metabisulfite (SMBS; $Na_2S_2O_5$) was used based on 100 parts by weight of the acrylic acid monomer in the step 3 of Example 1.

Example 4

A super absorbent polymer was prepared in the same manner as in Example 1, except that 0.056 parts by weight of sodium metabisulfite (SMBS; $Na_2S_2O_5$) was used based on 100 parts by weight of the acrylic acid monomer in the step 3 of Example 1.

Comparative Example 1

A super absorbent polymer was prepared in the same manner as in Example 1, except that 0.05 g of sodium persulfate (SPS) and 0.2 g of ethylene glycol diglycidyl ether (EJ1030s) were used in the monomer composition of Example 1, and sodium metabisulfite (SMBS; $Na_2S_2O_5$) was not used in the step 3 of Example 1.

Comparative Example 2

A super absorbent polymer was prepared in the same manner as in Example 1, except that 0.024 g of sodium persulfate (SPS) and 0.2 g of ethylene glycol diglycidyl ether (EJ1030s) were used in the monomer composition of Example 1, and sodium metabisulfite (SMBS; $Na_2S_2O_5$) was not used in the step 3 of Example 1.

Comparative Example 3

A super absorbent polymer was prepared in the same manner as in Example 1, except that 0.04 g of sodium persulfate (SPS) and 0.2 g of ethylene glycol diglycidyl ether (EJ1030s) were used in the monomer composition of Example 1, and sodium metabisulfite (SMBS; $Na_2S_2O_5$) was not used in the step 3 of Example 1.

Example 5

(Step 1) In a 3 L glass container equipped with a stirrer and a thermometer, 100 g of acrylic acid, 0.5 g of PEGDA 400 (polyethylene glycol diacrylate, Mw=400) as an internal cross-linking agent, 0.005 g of allyl methacrylate (AMA), 0.008 g of diphenyl(2,4,6-trimethylbenzoyl)-phosphine oxide (1-819) as a photopolymerization initiator and 0.12 g of sodium persulfate (SPS) as a thermal polymerization initiator were added and dissolved. Then, 188 g of 22% sodium hydroxide solution was added to prepare a monomer composition (degree of neutralization: 75 mol %; solid content: 41 wt %).

(Step 2) 0.02 g of a 28% sodium dodecyl sulfate (SDS) aqueous solution and 0.12 g of sodium bicarbonate were added to the monomer composition. Thereafter, the monomer composition was supplied at 500 to 2000 mL/min on a conveyor belt in which a belt having a width of 10 cm and a length of 2 m was rotated at 50 cm/min. And, at the same time as the supply of the monomer composition, ultraviolet rays having an intensity of 10 mW/cm$^2$ were irradiated to perform the polymerization reaction for 60 seconds, thereby obtaining a sheet-type hydrogel polymer having a moisture content of 55 wt %.

(Step 3) Subsequently, 0.040 parts by weight of sodium metabisulfite (SMBS; $Na_2S_2O_5$, Poohung Photo-Chemical Co., Ltd.) based on 100 parts by weight of the acrylic acid monomer was dissolved in 54 g of water, and then sprayed onto the hydrogel polymer cut to a size of about 5 cm×5 cm. Thereafter, it was chopped in a meat chopper to obtain hydrogel particle crumbs having a size of 1 mm to 10 mm.

(Step 4) Thereafter, the crumbs were dried in an oven capable of changing wind direction up and down. Thereafter, it was uniformly dried by flowing hot air at 185° C. or higher from the bottom to the top for 15 minutes, and then flowing from the top to the bottom for 15 minutes, and the moisture content of the dried crumbs was set to 2% or less. After drying, pulverization was performed with a pulverizing machine, followed by classification to prepare a base resin having a diameter of 150 to 850 μm.

(Step 5) A surface cross-linking solution was prepared by mixing 4 g of water, 1.0 g of propylene glycol, 0.08 g of ethylene glycol diglycidyl ether, and 0.05 g of a polycarboxylic acid-based copolymer (a copolymer of methoxy polyethylene glycol monomethacrylate and methacrylic acid, Mw=40,000) based on 100 g of the base resin. The surface cross-linking solution was sprayed on 100 g of the obtained base resin powder for mixing, put into a container consisting of a stirrer and a double jacket, and the surface cross-linking reaction was performed at 140° C. for 35 minutes. Thereafter, the surface-treated powder was classified with a ASTM standard mesh to obtain a super absorbent polymer powder having a particle diameter of 150 to 850 μm. Then, 0.1 g of fumed silica (AEROSIL® 200) was further mixed based on 100 parts by weight of the obtained polymer powder.

Comparative Example 4

A super absorbent polymer was prepared in the same manner as in Example 5, except that 0.24 g of sodium persulfate (SPS), 0.55 g of PEGDA 400, and 0.0055 g of allyl methacrylate (AMA) were used in the monomer composition of Example 5, and sodium metabisulfite (SMBS; $Na_2S_2O_5$) was not used in the step 3 of Example 5.

Comparative Example 5

A super absorbent polymer was prepared in the same manner as in Example 1, except that 0.006 parts by weight of sodium metabisulfite (SMBS; $Na_2S_2O_5$) was used based on 100 parts by weight of the acrylic acid monomer in the step 3 of Example 1.

Experimental Example: Measurement of Physical Properties of Super Absorbent Polymer The physical properties of the base resins and the super absorbent polymers prepared in Examples and Comparative Examples were evaluated in the following manner, and are shown in Tables 1 and 2 below. Unless otherwise indicated, all procedures were conducted in a constant temperature and humidity room (23±0.5° C., relative humidity of 45±0.5%). In order to prevent measurement errors, an average value of three measurements was taken as measurement data. In addition, physiological saline or saline used in the evaluation of the following physical properties means a 0.9 wt % sodium chloride (NaCl) aqueous solution.

(1) Centrifuge Retention Capacity (CRC)

The centrifuge retention capacity by absorption ratio under a non-loading condition of each polymer was measured according to the EDANA WSP 241.3.

Specifically, after inserting $W_0$ (g, about 0.2 g) of the super absorbent polymer uniformly in a nonwoven fabric envelope and sealing the same, it was soaked in saline (0.9 wt %) at room temperature. After 30 minutes, the envelope was centrifuged at 250G for 3 minutes to drain, and the weight $W_2$ (g) of the envelope was measured. Further, after carrying out the same operation without using the resin, the weight $W_1$ (g) of the envelope was measured. Then, CRC (g/g) was calculated by using the obtained weight values according to the following Equation 2.

$$CRC(g/g) = \{[W_2(g) - W_1(g)]/W_0(g)\} - 1 \qquad [\text{Equation 2}]$$

(2) Absorbency Under Pressure (AUP)

The absorbency under pressure at 0.7 psi of each polymer was measured according to the EDANA WSP 242.3.

Specifically, a 400 mesh stainless steel screen was installed in a cylindrical bottom of a plastic having an inner diameter of 60 mm. $W_0$ (g, 0.90 g) of the super absorbent polymer was uniformly scattered on the screen at room temperature and a humidity of 50%. Thereafter, a piston which can uniformly provide a load of 0.7 psi was placed thereon. Herein, the outer diameter of the piston was slightly smaller than 60 mm, there was no gap with the inner wall of the cylinder, and jig-jog of the cylinder was not interrupted. At this time, the weight $W_3$ (g) of the device was measured.

Subsequently, a glass filter having a diameter of 90 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. One sheet of filter paper with a diameter of 90 mm was placed thereon. After the measuring device was placed on the filter paper, the liquid was absorbed for 1 hour under a load. After 1 hour, the measuring device was lifted, and the weight $W_4$ (g) was measured.

Then, absorbency under pressure (g/g) was calculated by using the obtained weight values according to the following Equation 3.

$$AUP(g/g) = [W_4(g) - W_3(g)]/W_0(g) \qquad [\text{Equation 3}]$$

(3) Vortex Time (Absorption Rate)

The vortex time (absorption rate) of the super absorbent polymers of Examples and Comparative Examples was measured in the following manner.

① First, 50 mL of 0.9% saline was added to a 100 ml beaker with a flat bottom using a 100 mL Mass Cylinder.

② Next, after placing the beaker in the center of a magnetic stirrer, a magnetic bar (8 mm in diameter, 30 mm in length) was put in the beaker.

③ Thereafter, the stirrer was operated such that the magnetic bar stirred at 600 rpm, and the lowermost part of vortex generated by the stirring was made to reach the top of the magnetic bar.

④ After confirming that the temperature of the saline in the beaker reached 24.0° C., 2±0.01 g of a super absorbent polymer sample was added and a stopwatch was operated at the same time. Then, the time taken until the vortex disappeared and a surface of liquid became completely horizontal was measured in seconds, and this was taken as the vortex time.

(4) One-Minute Tap Water Absorbency

The one-minute tap water absorbency of the super absorbent polymers of Examples and Comparative Examples was measured in the following manner.

① First, 1 g of a super absorbent polymer was put into a tea bag having a width of 15 cm and a length of 30 cm, and the tea bag was immersed in 2 L of tap water and then swollen for 1 minute.

② Thereafter, the tea bag containing the swollen super absorbent polymer was lifted out of tap water. After 1 minute, the weight of the tea bag without tap water was measured together with the weight of the super absorbent polymer, and a value obtained by subtracting the weight of the empty tea bag from the above weight was used as the one-minute tap water absorbency.

At this time, the tap water used had an electrical conductivity of 170 to 180 μS/cm when measured using Orion Star A222 (manufactured by Thermo Scientific).

(5) Extractable Contents (16 hr E/C)

The extractable content of the super absorbent polymers of Examples and Comparative Examples was measured in accordance with EDANA (European Disposables and Nonwovens Association) WSP 270.2.

Specifically, 1.0 g of the super absorbent polymer was added to 200 g of a 0.9 wt % NaCl aqueous solution, and then kept to be soaked for 16 hours while stirring at 500 rpm. Then, the aqueous solution was filtrated by a filter paper. The filtrated solution was first titrated with a 0.1 N caustic soda solution to a pH of 10.0, and then reverse-titrated with a 0.1 N hydrogen chloride solution to a pH of 2.7. At this time, a polymer material that was not cross-linked was calculated from the amount required for the neutralization, and measured as the extractable content.

(6) Residual Monomer (RM)

The residual monomer content of the super absorbent polymers of Examples and Comparative Examples was measured according to the method disclosed in EDANA (European Disposables and Nonwovens Association) NWSP 210.0.R2 (15) "Polyacrylate Superabsorbent Powders—Determination of the Amount of Residual Acrylate Monomers".

(7) Ideal Hydrogel Index (IHI)

The IHI value was calculated by the Equation 1 with the CRC, E/C, and RM values of each super absorbent polymer obtained above.

(8) Permeability

The permeability of the super absorbent polymers of Examples and Comparative Examples was measured in the following manner.

Specifically, lines were marked on the liquid surface of 20 mL and 40 ml of a chromatography tube (F20 mm) in which a piston was inserted. As the chromatography tube used at this time, a tube having a size of 250 mm in length and 22 mm in diameter equipped with a glass filter having a diameter of 20 mm (Glass Fritted Filter Disc, P3:16-40 µm) and a lower valve (cock) was used. As the piston, a piston having a weight of 65 g was used to apply a pressure of 0.3 psi per unit area.

Thereafter, the piston was removed and water was inversely added so that bubbles were not generated between the glass filter and the lower valve at the bottom of the chromatography tube until about 10 ml of the tube was filled. Then, it was washed 2 to 3 times with 0.9 wt % saline and filled with saline up to 40 ml or greater. Thereafter, a piston was introduced to the chromatography tube, the lower valve was opened, and then the time (B) taken for the liquid surface to decrease from the line 40 ml to 20 ml was recorded.

Subsequently, 10 ml of saline was left in the chromatography tube, 0.2±0.0005 g of the classified (30 #~ 50 #) super absorbent polymer sample was added, saline was added to make the volume of saline 50 mL, and then left for 30 minutes. After that, the piston was introduced in the chromatography tube, left for 1 minute, and the lower valve of the chromatography tube was opened to record the time (T1) taken for the liquid surface to decrease from the line 40 mL to 20 mL. Then, the time (unit: sec) of T1-B was calculated according to Equation 4 below.

$$\text{Permeability(sec)} = T1 - B \quad \text{[Equation 4]}$$

in Equation 4,

T1 is the time taken for a liquid surface to decrease from 40 mL to 20 mL after adding 0.2±0.0005 g of a classified (30 #~50 #) super absorbent polymer sample in a chromatography tube, adding saline to make a volume of the saline 50 mL, and leaving it for 30 minutes, and B is the time taken for a liquid surface to decrease from 40 mL to 20 mL in a chromatography tube filled with saline.

TABLE 1

| | | Reducing agent | | | Properties of base resin | | | | | |
|---|---|---|---|---|---|---|---|---|---|---|
| | SPS (content*) | parts by weight based on 100 parts by weight of acrylic acid monomer | weight based on 100 parts by weight of SPS | number of moles based on 1 mol of SPS | CRC (g/g) | One-minute tap water absorbency (g) | Vortex time (sec) | 16 hr E/C (%) | RM (ppm) | IHI |
| Example 1 | 0.12 | 0.032 | 26.7 | 0.33 | 39.6 | 101 | 44 | 9.2 | 510 | 20.8 |
| Example 2 | 0.12 | 0.040 | 33.3 | 0.42 | 39.0 | 103 | 43 | 9.1 | 462 | 20.7 |
| Example 3 | 0.12 | 0.048 | 40.0 | 0.50 | 39.3 | 101 | 45 | 9.0 | 421 | 21.0 |
| Example 4 | 0.12 | 0.056 | 46.7 | 0.58 | 39.4 | 102 | 44 | 8.8 | 387 | 21.3 |
| Example 5 | 0.12 | 0.040 | 33.3 | 0.42 | 39.0 | 103 | 38 | 10.3 | 440 | 19.8 |
| Comp. Example 1 | 0.05 | — | — | — | 36.9 | 101 | 42 | 9.5 | 1971 | 17.5 |
| Comp. Example 2 | 0.24 | — | — | — | 39.4 | 102 | 44 | 11.4 | 549 | 19.0 |
| Comp. Example 3 | 0.40 | — | — | — | 40.2 | 94 | 47 | 14.1 | 265 | 18.2 |
| Comp. Example 4 | 0.24 | — | — | — | 40.0 | 102 | 41 | 16.4 | 562 | 17.0 |
| Comp. Example 5 | 0.12 | 0.006 | 5.0 | 0.06 | 40.5 | 100 | 45 | 12.1 | 992 | 18.6 |

*parts by weight based on 100 parts by weight of acrylic acid monomer

TABLE 2

Properties of super absorbent polymer

| | Reducing agent content based on 100 parts by weight of SPS | CRC (g/g) | AUP (g/g) | Vortex time (sec) | One-minute tap water absorbency (g) | Permeability (sec) | 16 hr E/C (%) | RM (ppm) | IHI |
|---|---|---|---|---|---|---|---|---|---|
| Example 1 | 26.7 | 31.9 | 22.5 | 32 | 110 | 11 | 6.1 | 385 | 21.1 |
| Example 2 | 33.3 | 32.1 | 22.6 | 32 | 115 | 11 | 6.1 | 341 | 21.3 |
| Example 3 | 40.0 | 31.7 | 22.7 | 32 | 110 | 11 | 5.9 | 302 | 21.6 |
| Example 4 | 46.7 | 31.9 | 22.6 | 32 | 112 | 11 | 5.8 | 267 | 22.0 |
| Comp. Example 2 | — | 32.2 | 22.2 | 32 | 110 | 11 | 7.4 | 429 | 19.4 |
| Comp. Example 5 | 5.0 | 32.5 | 22.1 | 32 | 111 | 12 | 7.7 | 788 | 18.5 |

As shown in Tables 1 and 2 above, it was confirmed that the super absorbent polymers of Examples 1 to 4 prepared by adding a reducing agent capable of a redox reaction with a thermal polymerization initiator in a certain amount or more compared to the thermal polymerization initiator content before drying the hydrogel polymer exhibited the same level of absorption rate and permeability compared to the super absorbent polymer of Comparative Example 2 which exhibited the same level of absorption performance without using such a reducing agent and the super absorbent polymer of Comparative Example 5 in which the reducing agent was used too little compared to the thermal polymerization initiator content. Further, the residual monomer content and the extractable content were simultaneously reduced in the super absorbent polymers of Examples 1 to 4. In addition, it was confirmed that all of the super absorbent polymers prepared according to Examples had an Ideal Hydrogel Index (IHI) of 20 or more.

In particular, looking at the physical properties of the base resins prepared in Comparative Examples 1 to 3, it can be seen that when the content of the thermal polymerization initiator increases, the residual monomer content decreases while the extractable content significantly increases, and when the content of the thermal polymerization initiator decreases, the extractable content decreases while the residual monomer content significantly increases. However, in the case of the base resins prepared in Examples 1 to 4 using a reducing agent, it can be confirmed that both the residual monomer content and the extractable content in the prepared super absorbent polymer can be reduced by increasing the reducing agent content without adjusting the thermal polymerization initiator content.

In addition, the base resin of Example 5 was prepared by changing the type and content of the internal cross-linking agent from the super absorbent polymers of Examples 1 to 4, but it could be seen that Example 5 had the residual monomer content and the extractable content reduced compared to the base resin of Comparative Example 4 prepared without using a reducing agent in Example 5.

Accordingly, regardless of the type of the internal cross-linking agent used, when a reducing agent capable of a redox reaction with a thermal polymerization initiator is used in the chopping process before drying the hydrogel polymer, it is possible to prepare a super absorbent polymer in which the residual monomer content and the extractable content are simultaneously reduced without deterioration in various physical properties such as absorption performance, absorption rate, and permeability.

The invention claimed is:

1. A method for preparing a super absorbent polymer, comprising:
    preparing a monomer composition containing an acrylic acid-based monomer having acidic groups in which at least one of the acidic groups is neutralized, an internal cross-linking agent, and a thermal polymerization initiator;
    preparing a hydrogel polymer by cross-linking polymerization of the monomer composition;
    mixing the hydrogel polymer with a reducing agent in an amount of 10 parts by weight to 100 parts by weight based on 100 parts by weight of the thermal polymerization initiator;
    chopping the hydrogel polymer;
    forming a base resin by drying and pulverizing the hydrogel polymer after the chopping; and
    forming a surface cross-linked layer on at least a part of a surface of the base resin by further cross-linking the surface of the base resin in the presence of a surface cross-linking agent,
    wherein the reducing agent comprises at least one selected from the group consisting of sulfoxylates and metabisulfites.

2. The method for preparing a super absorbent polymer of claim 1,
    wherein the reducing agent comprises sodium formaldehyde sulfoxylate ($HOCH_2SO_2Na$), or sodium metabisulfite ($Na_2S_2O_5$).

3. The method for preparing a super absorbent polymer of claim 1,
    wherein the amount of the reducing agent is 10 parts by weight to 80 parts by weight based on 100 parts by weight of the thermal polymerization initiator.

4. The method for preparing a super absorbent polymer of claim 1,
    wherein, in the mixing the hydrogel polymer with the reducing agent, the reducing agent is mixed in a solution state dissolved in a solvent.

5. The method for preparing a super absorbent polymer of claim 1,
    wherein the thermal polymerization initiator comprises a persulfate-based compound.

6. The method for preparing a super absorbent polymer of claim 1,
wherein an amount of the thermal polymerization initiator is 0.05 to 0.25 parts by weight based on 100 parts by weight of the acrylic acid-based monomer.

7. The method for preparing a super absorbent polymer of claim 1,
wherein the monomer composition further comprises a photoinitiator.

8. The method for preparing a super absorbent polymer of claim 1,
wherein a foaming agent is used during the cross-linking polymerization of the monomer composition.

9. The method for preparing a super absorbent polymer of claim 1,
wherein the super absorbent polymer has a residual monomer content measured according to a method of EDANA NWSP 210.0.R2 of 500 ppm or less, and an extractable content measured according to the method of EDANA WSP 270.2 of less than 10 wt %.

10. The method for preparing a super absorbent polymer of claim 1,
wherein the super absorbent polymer has an Ideal Hydrogel Index (IHI) calculated by the following Equation 1 of 20 or more:

$$\text{Ideal Hydrogel Index(IHI)} = (CRC+8.7)/[\ln\{E/C+(RM/500)\}] \quad \text{Equation 1}$$

wherein, in Equation 1,
CRC is centrifuge retention capacity measured according to the method of EDANA NWSP 241.0.R2,
E/C is an extractable content measured according to the method of EDANA WSP 270.2, and
RM is a residual monomer content remaining in the super absorbent polymer measured according to the method of EDANA NWSP 210.0.R2.

* * * * *